US008776015B1

(12) United States Patent
Hosagrahara et al.

(10) Patent No.: US 8,776,015 B1
(45) Date of Patent: Jul. 8, 2014

(54) PATTERN MODELING METHODS AND SYSTEMS

(75) Inventors: Arvind S. Hosagrahara, Novi, MI (US); Paul F. Smith, Milan, MI (US)

(73) Assignee: The MathWorks, Inc., Natick, MA (US)

(*) Notice: Subject to any disclaimer, the term of this patent is extended or adjusted under 35 U.S.C. 154(b) by 1847 days.

(21) Appl. No.: 11/882,825

(22) Filed: Aug. 6, 2007

Related U.S. Application Data

(63) Continuation-in-part of application No. 11/703,732, filed on Feb. 8, 2007, now Pat. No. 8,336,025.

(51) Int. Cl.
*G06F 9/44* (2006.01)

(52) U.S. Cl.
USPC ............................ 717/113; 717/105; 717/111

(58) Field of Classification Search
None
See application file for complete search history.

(56) References Cited

U.S. PATENT DOCUMENTS

| | | | | |
|---|---|---|---|---|
| 5,187,788 A * | 2/1993 | Marmelstein | ................. | 717/109 |
| 6,151,699 A * | 11/2000 | Watanabe | ..................... | 717/113 |
| 6,289,513 B1 * | 9/2001 | Bentwich | ....................... | 717/106 |
| 6,553,268 B1 * | 4/2003 | Schwenke et al. | .............. | 700/18 |
| 6,606,740 B1 * | 8/2003 | Lynn et al. | ..................... | 717/100 |
| 6,681,383 B1 * | 1/2004 | Pastor et al. | ................... | 717/126 |
| 6,836,878 B1 * | 12/2004 | Cuomo et al. | ................. | 717/100 |
| 6,986,120 B2 * | 1/2006 | Reddy et al. | ................... | 717/104 |
| 7,047,518 B2 | 5/2006 | Little | | |
| 7,088,377 B2 * | 8/2006 | Cook | ............................ | 345/649 |
| 7,114,146 B2 * | 9/2006 | Zhang et al. | ................... | 717/106 |
| 7,272,708 B1 * | 9/2007 | Nanja et al. | ....................... | 713/1 |
| 7,275,096 B2 * | 9/2007 | Green | ............................ | 709/223 |
| 7,334,216 B2 * | 2/2008 | Molina-Moreno et al. | ... | 717/109 |
| 7,484,201 B2 * | 1/2009 | Miyauchi et al. | .............. | 717/113 |
| 7,496,888 B2 * | 2/2009 | Sanjar et al. | ................... | 717/105 |
| 7,506,306 B2 * | 3/2009 | Huang et al. | ................... | 717/113 |
| 7,536,676 B2 * | 5/2009 | Baker et al. | .................... | 717/113 |
| 7,543,267 B2 * | 6/2009 | Lindhorst et al. | ............. | 717/105 |
| 7,553,942 B2 | 6/2009 | Itsenko | | |
| 7,802,230 B1 * | 9/2010 | Mendicino et al. | ........... | 717/113 |
| 7,949,995 B2 * | 5/2011 | Sadlek | .......................... | 717/109 |
| 8,266,579 B2 * | 9/2012 | Kelly et al. | .................... | 717/105 |
| 8,522,196 B1 * | 8/2013 | Kim et al. | ...................... | 717/105 |
| 8,533,666 B2 * | 9/2013 | Shukla et al. | .................. | 717/109 |
| 2001/0034879 A1 * | 10/2001 | Washington et al. | ............. | 717/1 |
| 2002/0091990 A1 * | 7/2002 | Little et al. | .................... | 717/105 |
| 2002/0196282 A1 * | 12/2002 | Washington et al. | ......... | 345/763 |
| 2003/0167455 A1 * | 9/2003 | Iborra et al. | ................... | 717/105 |
| 2004/0111702 A1 * | 6/2004 | Chan | ............................. | 717/113 |
| 2004/0205691 A1 * | 10/2004 | Poole et al. | .................... | 717/100 |
| 2005/0107998 A1 | 5/2005 | McLernon et al. | | |
| 2005/0216248 A1 | 9/2005 | Ciolfi et al. | | |
| 2005/0216887 A1 * | 9/2005 | Robertson et al. | ............. | 717/113 |
| 2005/0229154 A1 * | 10/2005 | Hiew et al. | .................... | 717/110 |

(Continued)

*Primary Examiner* — Tuan Q. Dam
*Assistant Examiner* — Zheng Wei
(74) *Attorney, Agent, or Firm* — Venable LLP; Michael A. Sartori; Todd R. Farnsworth

(57) ABSTRACT

A list of constructs is displayed on a user interface screen for a user to select a desired construct. A construct selected by the user is determined. Computing environments are presented on the user interface screen for the user to place the selected construct. The computing environments include at least one textual and at least one graphical computing environment. A selected computing environment into which the selected construct is being placed is identified. A position of the placed construct in the selected computing environment is determined. A template based on the selected computing environment is selected. The selected template is inserted into the selected computing environment.

22 Claims, 11 Drawing Sheets

(56) References Cited

U.S. PATENT DOCUMENTS

| | | |
|---|---|---|
| 2005/0278162 A1 | 12/2005 | Ciolfi et al. |
| 2006/0015839 A1* | 1/2006 | Owens et al. ............... 717/100 |
| 2006/0064670 A1* | 3/2006 | Linebarger et al. ........... 717/106 |
| 2006/0129371 A1 | 6/2006 | Orofino, II et al. |
| 2006/0139372 A1 | 6/2006 | Orofino, II |
| 2006/0168558 A1* | 7/2006 | de Seabra e Melo et al. 717/105 |
| 2006/0235548 A1 | 10/2006 | Gaudette |
| 2006/0242223 A1 | 10/2006 | Shawver et al. |
| 2007/0061778 A1* | 3/2007 | Sadlek ........................ 717/113 |
| 2007/0150864 A1* | 6/2007 | Goh ............................ 717/113 |
| 2007/0192759 A1* | 8/2007 | Ishii et al. ................... 717/113 |
| 2008/0120594 A1* | 5/2008 | Lucas et al. ................. 717/105 |
| 2008/0148221 A1* | 6/2008 | Letkeman et al. ........... 717/104 |
| 2008/0301625 A1* | 12/2008 | Cook et al. .................. 717/104 |
| 2009/0070738 A1* | 3/2009 | Johnson ....................... 717/106 |
| 2009/0089746 A1* | 4/2009 | Rigolet ........................ 717/113 |
| 2009/0144439 A1* | 6/2009 | Ziegler et al. ................ 709/231 |
| 2009/0228864 A1* | 9/2009 | Washington et al. ......... 717/105 |
| 2009/0241089 A1* | 9/2009 | Ramamoorthy et al. ..... 717/105 |
| 2010/0070945 A1* | 3/2010 | Tattrie et al. ................. 717/101 |
| 2010/0088664 A1* | 4/2010 | Khodabandehloo et al. . 717/103 |
| 2010/0211638 A1* | 8/2010 | Rougier ....................... 709/205 |
| 2011/0010686 A1* | 1/2011 | Wilson et al. ................ 717/104 |
| 2012/0054717 A1* | 3/2012 | Huang et al. ................. 717/113 |
| 2012/0131545 A1* | 5/2012 | Linebarger et al. ........... 717/105 |
| 2013/0179775 A1* | 7/2013 | Asakawa et al. ............. 715/234 |

* cited by examiner

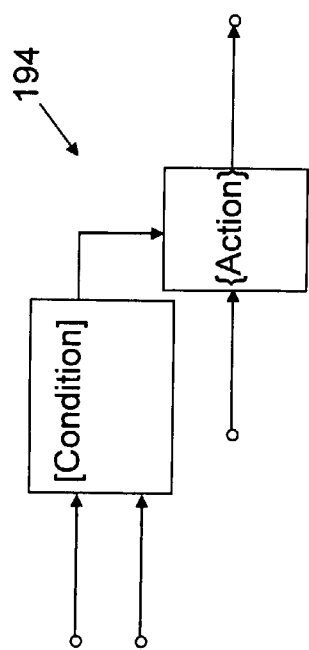
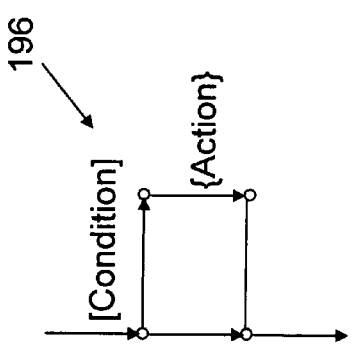
FIG. 1C
FIG. 1D

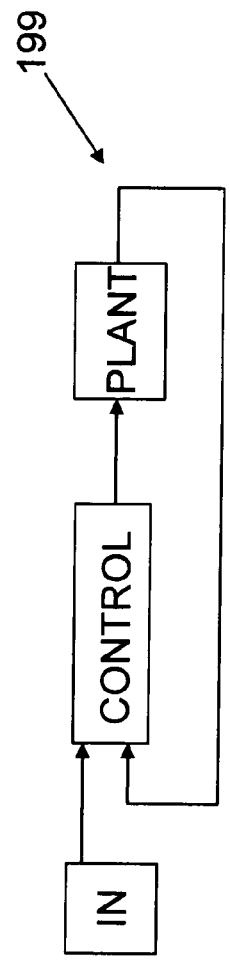

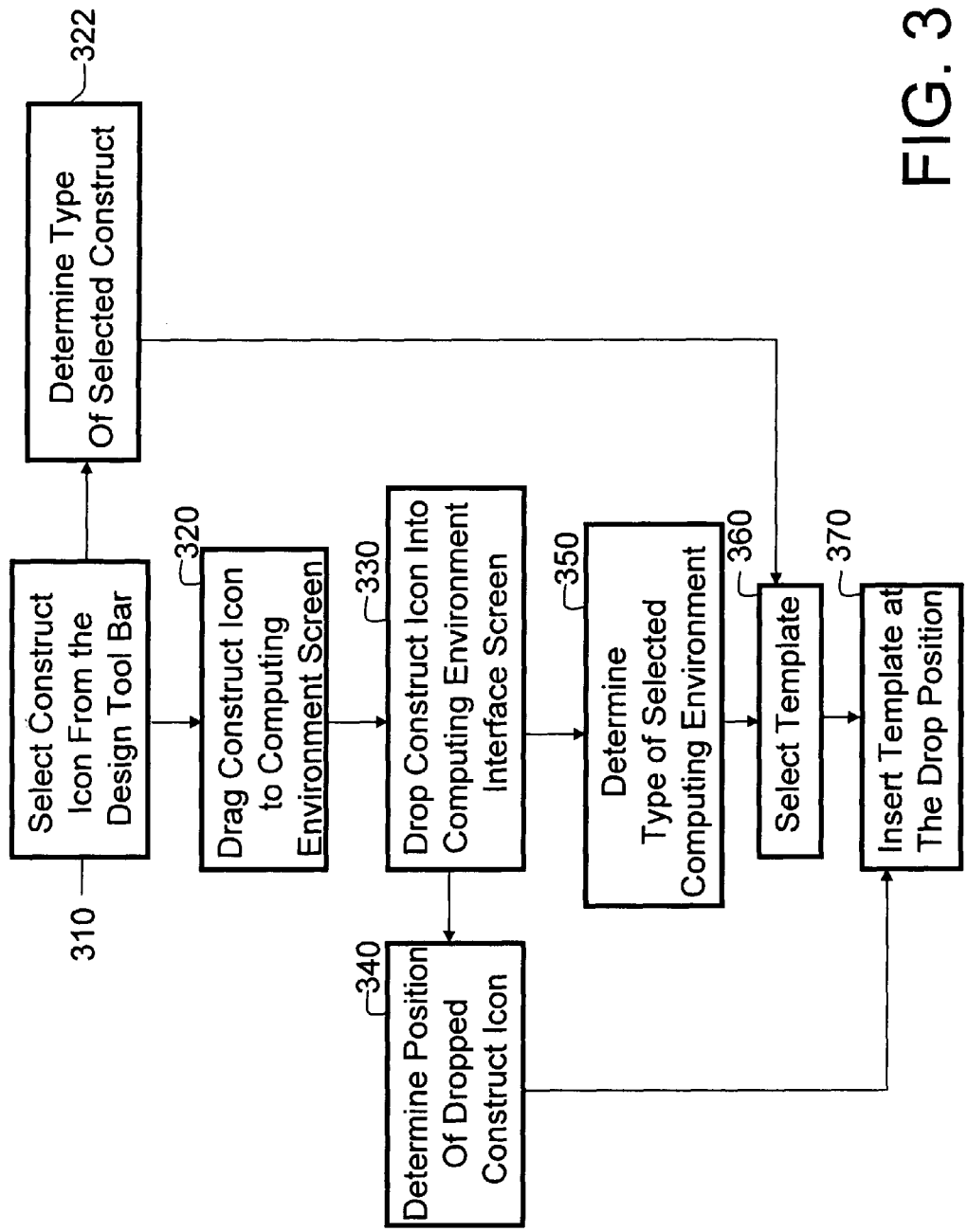

PATTERN MODELING METHODS AND SYSTEMS

CROSS-REFERENCE TO RELATED PATENT APPLICATION

This application is a continuation in part of U.S. patent application Ser. No. 11/703,732, by Hosagrahara et al., filed Feb. 8, 2007 now U.S. Pat. No. 8,336,025, entitled "Pattern Modeling Methods And Systems," 42323-237166, the subject matter of which application is being incorporated herein by reference in its entirety.

BACKGROUND

The following relates to model-based systems development. More particularly, the following relates to systems modeling patterns in textual and graphical computing environments. It is to be appreciated, however, that the following may be applicable to other computing environments, computing systems and the like.

Many organizations are employing the practice of specifying, simulating, analyzing, verifying, validating and implementing systems using a model of system behavior. System implementation typically consists of automatically generating code for portions of the model, particularly portions corresponding to the system's control and signal and image processing algorithms.

Modeling environments may refer to computing environments that enable a user to construct and analyze a model of a process or system. Model-based design tools included within the modeling environments and features of the model design tools may provide techniques for users to approach the modeling process. Some users may find these model-based design tools unsatisfactory, especially in complex modeling environments. In addition, existing model-based design tools may make models difficult to understand and/or maintain, which may lead to inefficient system implementation.

BRIEF DESCRIPTION

In one embodiment, content may be inserted into a model using a design tool. A list of constructs is displayed on a user interface screen for a user to select a desired construct. A construct selected by the user is determined. Computing environments are presented on the user interface screen for the user to place the selected construct. The computing environments include at least one textual and at least one graphical computing environment. A selected computing environment into which the selected construct is being placed is identified. A position of the placed construct in the selected computing environment is determined. A template based on the selected computing environment is selected. The selected template is inserted into the selected computing environment.

In another embodiment, a system may be implemented for designing models. A means presents a list of constructs on a user interface screen for a user to select a desired construct. A means determines a construct selected by the user. A means identifies a selected computing environment into which the selected construct is being placed, the computing environment being selected from at least one textual and at least one graphical computing environments. A means determines a position at which the construct is placed into the selected computing environment. A means for selecting a template based on the selected computing environment. A means inserts the selected template into the selected computing environment at the determined position and interconnects the inserted construct with content of the selected computing environment at the position of insertion.

BRIEF DESCRIPTION OF THE DRAWINGS

Various embodiments of the present application will be understood and appreciated more fully from the following detailed description, taken in conjunction with the drawings, in which:

FIG. 1C is a diagrammatic illustration of an exemplary construct according to an exemplary embodiment;

FIG. 1D is a diagrammatic illustration of another exemplary construct according to an exemplary embodiment;

FIG. 1E is a diagrammatic illustration of another exemplary construct according to an exemplary embodiment;

FIG. 1F is a diagrammatic illustration of another exemplary construct according to an exemplary embodiment;

FIG. 3 is a flow diagram of an exemplary data modeling method according to an exemplary embodiment;

DEFINITIONS

Figure 1A:
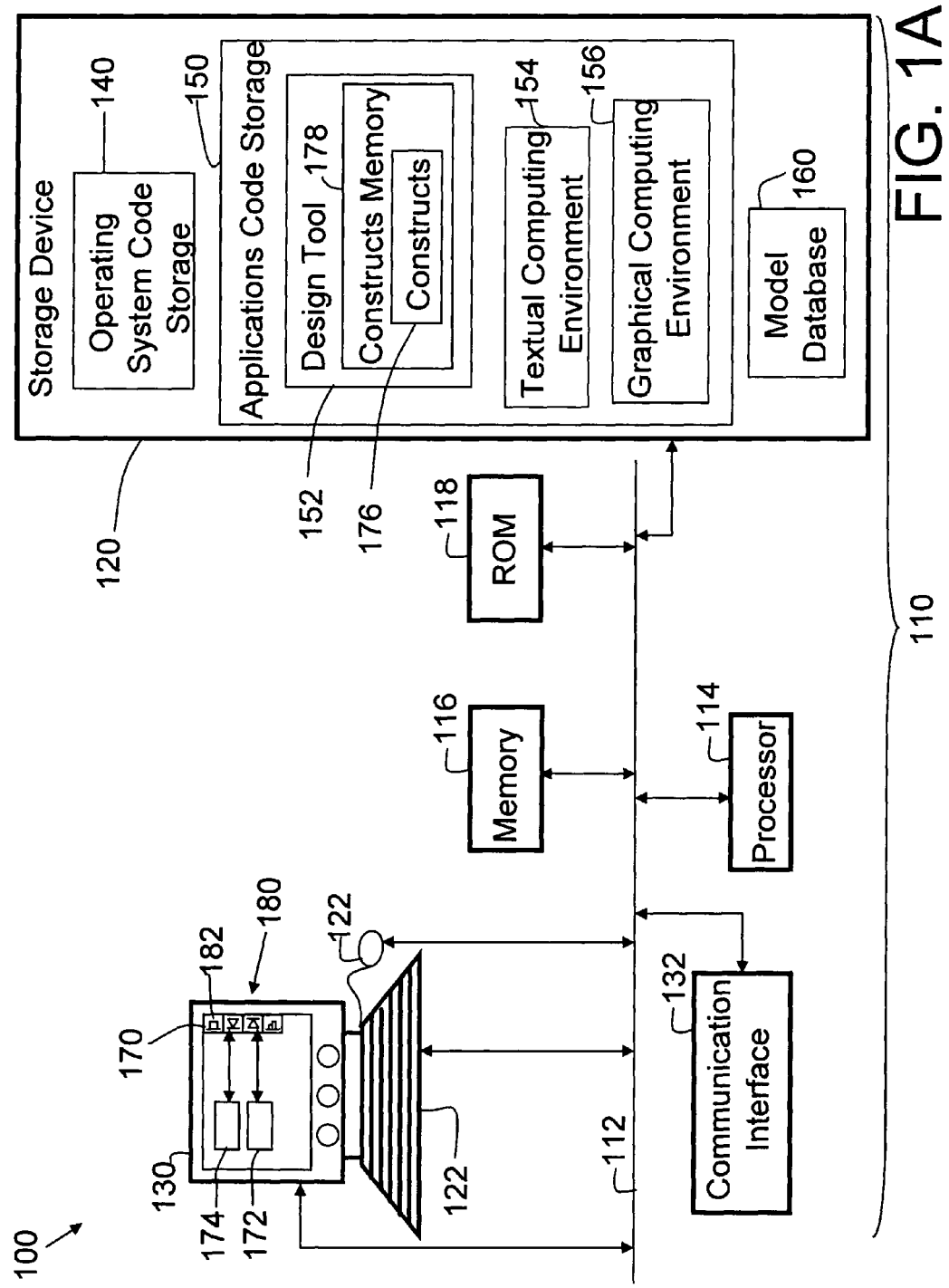
FIG. 1A is a diagrammatic illustration of an exemplary modeling system according to an exemplary embodiment.

In the following description, the following definitions are applicable throughout (including above).

A "computer" may refer to one or more apparatus and/or one or more systems that are capable of accepting a structured input, processing the structured input according to predetermined rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a personal digital assistant (PDA); a portable telephone; application-specific hardware to emulate a computer and/or software, such as, for example, a digital signal processor (DSP), a field-programmable gate array (FPGA), a general graphics processor (GPA), a graphics processing unit (GPU), a general purpose processors (GPP), an application specific instruction-set processor (ASIP), an application specific integrated circuit (ASIC), an embedded processor, a chip, chips, a system on a chip, multi-processor system on chip (MPSoC), or a chip set; a data acquisition device; an optical computer; and an apparatus that may accept data, may process data in accordance with one or more stored software programs, may generate results, and typically may include input, output, storage, arithmetic, logic, and control units.

"Software" may refer to predetermined rules to operate a computer. Examples of software may include: software; code segments; instructions; applets; pre-compiled code; interpreted code; compiled code; computer programs; and programmed logic.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a flash removable memory; a memory chip; and/or other types of media that can store machine-readable instructions thereon.

A "computer system" may refer to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), and/or synchronous optical network (SONET), user datagram protocol (UDP), IEEE 802.x, etc.

A "modeling environment" may refer to a graphical application where a model may be translated into executable instructions.

A "computing environment context" may refer to circumstances under which a device or system is used or a metadata about items created externally. Such metadata may include resources, events, etc. about items.

DETAILED DESCRIPTION

Exemplary embodiments are described in detail below. While specific exemplary embodiments are discussed, it should be understood that this is done for illustration purposes only. In describing and illustrating the exemplary embodiments, specific terminology is employed for the sake of clarity. However, the following is not intended to be limited to the specific terminology so selected. A person skilled in the relevant art will recognize that other components and configurations may be used without parting from the spirit and scope of the application. It is to be understood that each specific element includes all technical equivalents that operate in a similar manner to accomplish a similar purpose. The examples and embodiments described herein are non-limiting examples.

According to the exemplary embodiments, a design tool includes a palette of constructs or patterns. The pattern palette may be predefined by a system administrator, created by a user, and/or modified by the user. The design tool is implementation dependent and operates across various types of computing environments such as text-based, graphics-based, etc. The design tool further operates above particular typical model types (text, graphical, etc.) The patterns automatically take on an appropriate form for the context of the particular computing environment they are used in. Such design tool relieves the user from having to keep track of things and makes models easier to understand and create.

With reference to FIG. 1A, an exemplary model designing system 100 includes an exemplary computer 110 which may include a bus 112, a processor 114, a computer-readable medium or memory 116, a read only memory (ROM) 118, a storage device 120, an input device 122, an output device 130, and a communication interface 132.

The bus 112 may include one or more interconnects that permit communication among the components of the computer 110. The processor 114 may include any type of processor, microprocessor, multi-core processor, or processing logic that may interpret and execute instructions. The memory 116 may include a random access memory (RAM) or another type of dynamic storage device that may store information and instructions for execution by the processor 114. The memory 116 may also be used to store temporary variables or other intermediate information during execution of instructions by the processor 114.

The ROM 118 may include a ROM device and/or another type of static storage device that may store static information and instructions for the processor 114. The storage device 120 may include a magnetic disk and/or optical disk and its corresponding drive for storing information and/or instructions. The storage device 120 may include a single storage device or multiple storage devices, such as multiple storage devices operating in parallel. Moreover, the storage device 120 may reside locally on the computer 110 and/or may be remote with respect to the computer 110 and connected thereto via a network and/or another type of connection, such as a dedicated link or channel. For example, the storage device 120 may store code 140 for the operating system (OS) of the computer 110, code 150 for applications running on the operation system including modeling applications such as a design tool 152, a textual or text-based computing environment 154, a graphical or graphics-based computing environment 156, and a model database 160 to store the models created with the design tool 152.

The input device 122 may include any mechanism or combination of mechanisms that permit an operator or user to input information to the computer 110, such as a keyboard, a mouse, accelerometer and gyroscope based input devices, neuro-based interface devices, a touch sensitive display device, a microphone, a pen-based pointing device, and/or a biometric input device, such as a voice recognition device and/or a finger print scanning device. The computer 110 may receive through the input device 122 input data necessary for creating patterns and models in one of the computing environments 154, 156 with the design tool 152.

The output device 130 may include any mechanism or combination of mechanisms that outputs information to the operator, including a display, a printer, a speaker, etc. The computer 110 may display on the display 130 a user interface screen or screens such as a design tool bar window or screen 170 interfaced with the design tool 152, a textual or text-based computing environment screen 172 interfaced with the textual computing environment 154, and a graphical or graphics-based computing environment screen 174 interfaced with the graphical computing environment 156.

With continuing reference to FIG. 1A, constructs or patterns 176 may be predefined by a user or a system administrator for each computing environment context and stored in a constructs memory 178. The constructs 176 may be displayed as a list 180 or palette of associated construct icons 182 in the tool bar window 170. As described in detail below, the users may modify the constructs 176, construct icons 182 or the list 180 of construct icons 182. For example, the users may add, delete, rename, import or export the constructs 176 or construct icons 182. The users may organize the list 180 of constructs 182 in accordance with their preferences.

Figure 1B:
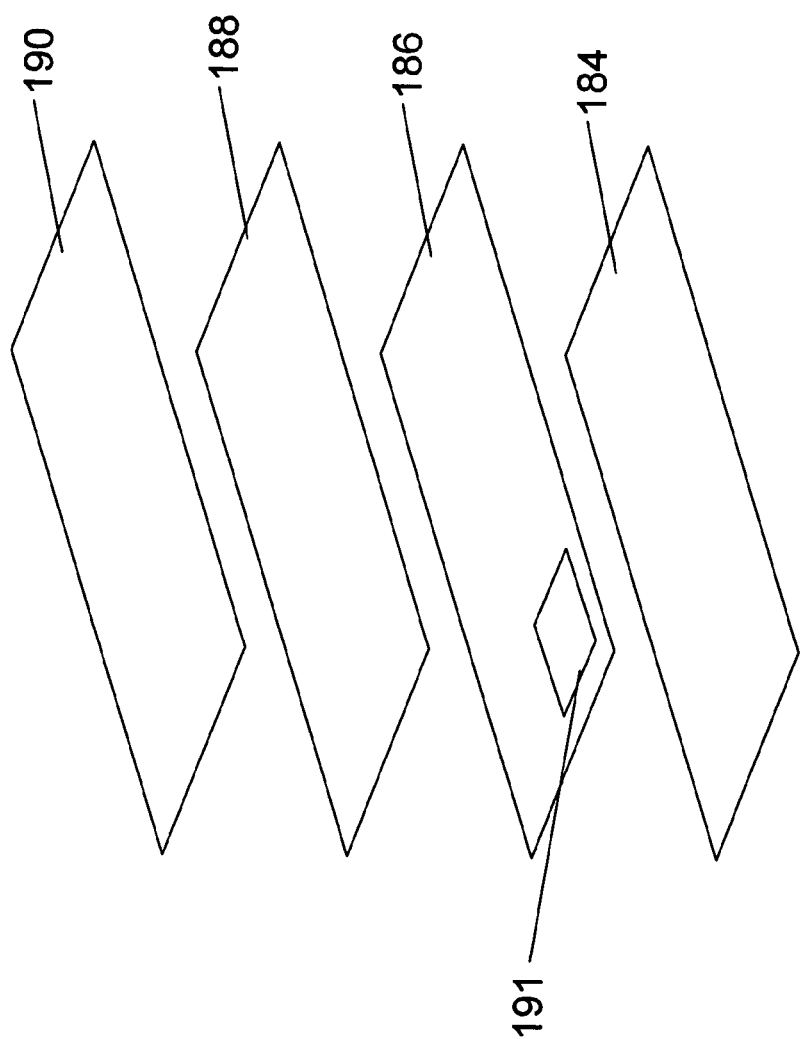
FIG. 1B is a diagrammatic illustration of exemplary multiple computing layers according to an exemplary embodiment.

With continuing reference to FIG. 1A and further reference to FIG. 1B, an exemplary model designing system 100 may include multiple layers, e.g. computing layers. The model designing system 100 may include the textual and graphical environments 152, 154 illustrated as first and second layers 184, 186. A third layer 188 may be a transformation layer. A fourth layer 190 may be the design tool 152. In an exemplary embodiment, the design tool 152 may be a standalone graphical application which may include a floating bar window. The transformation layer may transform the construct icons 182 as the construct icons 182 pass through the transformation layer and into one of the first and second layer 184, 186. A layer may be added in between existing layers. Further, the order of two or more layers may be switched. One or more layers may be switched to an on- or off-state. The layer may be locked to prevent changes to the layer, or unlocked to allow changes to the layer. The layer 182, 184 may have one or more windows cut out of it, such as a window 191 in the second layer 186.

With continuing reference to FIG. 1A, an example of the textual computing environment 154 includes a text-based computing environment such as a computer script language such as MATLAB® by The MathWorks, Inc. of Natick, Mass. The MATLAB® is a high-performance language for technical computing. It integrates computation, visualization, and programming in one environment where problems and solutions are expressed in familiar mathematical notation. MATLAB® employs a matrix-based mathematical programming language which can operate on numeric arrays of vectors and matrices, character arrays, cell arrays, etc.

Another example of the text-based environment includes a Hardware Description Language (HDL) which is a standard text-based expression of a temporal behaviour and/or (spatial) circuit structure of an electronic system. An HDL's syntax and semantics include explicit notations for expressing time and concurrency which are the primary attributes of hardware. HDL may be used to write executable specifications of a piece of hardware. For exmaple, a simulation program, designed to implement the underlying semantics of the language statements, coupled with simulating the progress of time, may provide the hardware designer with the ability to model a piece of hardware before it is created physically.

Other examples of the text-based environment include C code, Python script, Javascript script, hardware description language, and Octave.

The examples of the graphical computing environment 156 may include graphical modeling environments such as a block-based SIMULINK® and a chart-based STATE-FLOW® by The MathWorks, Inc. of Natick, Mass. The SIMULINK® and STATEFLOW® are software packages that enable the user to model, simulate, and analyze systems whose outputs change over time using the block diagrams or charts. Such systems are often referred to as dynamic systems. The SIMULINK® and STATEFLOW® can be used to explore the behavior of a wide range of real-world dynamic systems, including electrical circuits, shock absorbers, braking systems, and many other electrical, mechanical, fluid, thermodynamic, quantum and biological/life systems. Block diagrams and charts are graphical entities having an "executable meaning" that are created within the modeling computing environment for modeling a dynamic system, and generally comprise one or more graphical objects.

For example, a block diagram model of a dynamic system is represented schematically as a first collection of graphical objects, such as nodes, that are interconnected by another set of graphical objects, generally illustrated as lines, which represent logical or physical connections or decision/process flow between the first collection of graphical objects. The line segments are often referred to as "signals". Signals correspond to the time-varying quantities represented by each line connection and have values at each time instant and are not electromagnetic signals. A signal can be read from a location and stored at another location. Each node may represent an elemental dynamic system, component or algorithm, and the relationships between signals and state variables may be defined by computations, sets of equations, etc. represented by the nodes Inherent in the definition of the relationship between the signals and the state variables is the notion of parameters, which are the coefficients of the equations. The equations define a relationship between the input signals, output signals, state, and time, so that each line represents the input and/or output of an associated elemental dynamic system. A line emanating at one node and terminating at another signifies that the output of the first node is an input to the second node. The source node of a signal writes to the signal at a given time instant when its system equations are solved. The destination nodes of this signal read from the signal when their system equations are being solved. Those skilled in the art will recognize that the term "nodes" does not refer exclusively to elemental dynamic systems but may also include other modeling elements that aid in readability and modularity of block diagrams.

The STATEFLOW® charts are graphical diagrams used to capture behavior of reactive systems and processes. The data flow blocks are block diagrams that describe a graphical programming paradigm where the availability of data may be used to initiate the execution of blocks, where a block represents an operation and a line represents execution dependency describing the direction of data flowing between blocks. For example, in a model of a physical system, the blocks may represent physical entities such as gears, bodies, joints, pipes and the like, and the lines represent physical connection between the physical entities.

The techniques and exemplary embodiments described herein may be embodied in various user interfaces, graphical models, modeling environment, and technical computing environments, including state-based and flow diagram environments, data flow diagram environments, entity flow network diagrams, electronic design automation (EDA) environments, Schematic Layout environments, and Unified Modeling Language (UML) environments, such as those using software products of LabVIEW® or MATRIX from National Instruments, Inc. of Austin, Tex., Virtuoso, Incisive, or Encounter from Cadence of San Jose, Calif., Dymola from Dynasim AB of Lund, Sweden, SystemView from Elanix of Norcross, Ga., MATHEMATICA® from Wolfram Research, Inc. of Champaign, Ill., MATHCAD® from Mathsoft Engineering & Education Inc. of Cambridge, Mass., MAPLE™ from Maplesoft, a division of Waterloo Maple Inc. of Waterloo, Ontario of Canada, GALAXY™ or DISCOVERY™ from Synopsis, Inc. of Mountain View, Calif., Design Architect, Questa, or Board Station from Mentor Graphics Corp. of Wilsonville, Oreg., Rose from International Business Machine Corporation of Armonk, N.Y., Rhapsody from I-Logix, Inc. of Andover, Mass., or Artisan from Artisan Software Tools, Inc. of Beaverton, Oreg. and the like.

With reference to FIG. 1C, an illustrated exemplary construct template IF-END IF 194 is predefined by the user or system administrator as a pattern of blocks for the graphical modeling or computing environment.

With reference to FIG. 1D, an illustrated exemplary construct template IF-END IF 196 is predefined by the user or system administrator as a flowchart for the graphical modeling or computing environment.

With reference to FIG. 1E, an illustrated exemplary construct template IF-END IF 198 is predefined by the user or system administrator as text for the text-based modeling or computing environment.

With reference to FIG. 1F, an illustrated exemplary construct template TOP LEVEL ARCHITECTURE 199 is predefined by the user or system administrator for the graphical modeling or computing environment.

Other examples of the constructs, which may be predefined by the user, include IF-cascade of ELSE IF-END IF, SWITCH condition—cascade of CASE, DO-WHILE loop, REPEAT-UNTIL loop, IF-nested IF condition-nested IF condition-END IF-END IF, FOR loop, SIMPLE STATE MACHINE, IF-THEN-ELSE-IF, IF-THEN-IF, IF-THEN, IF-THEN-ELSE, IF, cascade of IF-THEN, FOR-WHILE, FOR-loop, WHILE-loop, case, combination of logical signals, vector signals, conditions, conditions with subconditions, conditions which are visually separated, UNLESS conditions, a proportional-integral-derivative (PID) controller, a proportional-integral (PI) controller, a proportional-derivative (PD) controller, an integral-derivative (ID) controller, a proportional (P) controller, a derivative (D) controller, first order through nth order filters as well as other kind of filters, joints, arms, masses, pipes, pressure vessels and combinations thereof, etc. The constructs may include parameterized constructs. For example, for a SWITCH construct, the user may be queried for a number of cases.

The communication interface 132 may include any transceiver like mechanism that enables the computer 110 to communicate with other devices and/or systems, such as client computers. For example, the communication interface 132 may include one or more interfaces. Alternatively, the communication interface 132 may include other mechanisms for communicating via a network, such as a wireless network. In one implementation, the communication interface 132 may include logic to send code to a destination device, such as a target device that can include general purpose hardware (e.g., a personal computer form factor), dedicated hardware (e.g., a digital signal processing (DSP) device or a field programmable gate array (FPGA) adapted to execute a compiled version of a model or a part of a model), etc.

The computer 110 may perform certain functions in response to the processor 114 executing software instructions included in the computer-readable medium, such as memory 116. A computer-readable medium may be defined as one or more memory devices. In alternative embodiments, hardwired circuitry may be used in place of or in combination with software instructions to implement features consistent with principles of the exemplary embodiments. Thus, implementations consistent with principles of the application are not limited to any specific combination of hardware circuitry and software.

Figure 2A:
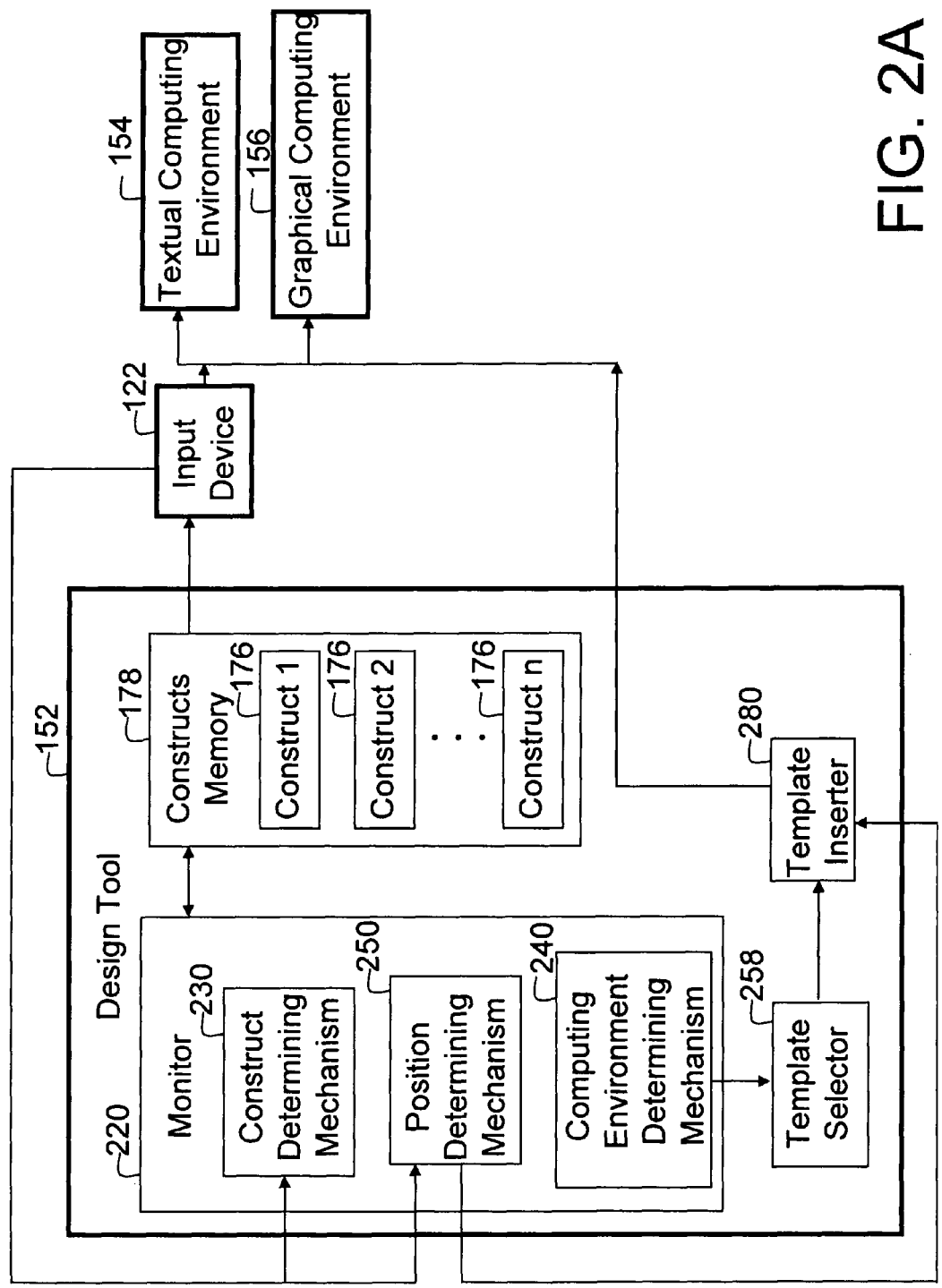
FIG. 2A is a diagrammatic illustration of a detailed portion of the modeling system according to an exemplary embodiment.

With continuing reference to FIG. 1A and further reference to FIG. 2A, the user may select the construct icon 182 on the design tool screen 170 with the input device 122 and place the selected construct icon 182 into the computing environment interface screen 172, 174 associated with the desired computing environment such as the textual computing environment 154 or graphical computing environment 156. For example, the user may click with the input device, such as the mouse 122, on the construct icon 182 associated with a respective construct 176 within, for example, a list of construct icons 182 displayed in the design tool bar window 170, may select an appropriate entry from a pull down menu, and the like. The user may drag the selected construct icon 182 with the mouse 122, release the mouse 122 and drop the dragged construct icon 182 into one of the computing environment interface screens 172, 174 which each interfaces with a respective one of the computing environments 154, 156. A monitor 220 may monitor the design tool bar window 170, detect that the construct icon 182 is selected and dropped into one of the computing environment interface screens 172, 174. More specifically, a construct determining mechanism, device, algorithm, processor, software module, or other means 230 may determine a type of a construct 176 associated with the selected construct icon 182 and placed by the user into the computing environment screen 172, 174.

A computing environment determining mechanism, device, algorithm, processor, software module, or other means 240 may determine a type of the computing environment into which the user dropped the selected construct icon 182. A position determining mechanism, device, algorithm, processor, software module, or other means 250 may determine a position into which the construct icon 182 is dropped. A template selector, mechanism, device, algorithm, processor, software module, or other means 258 may select an appropriate template based on the determined type of the selected computing environment 154, 156 and/or other criteria such as preferred style which may be entered by the user or selected automatically based on user identification.

Figure 2B:
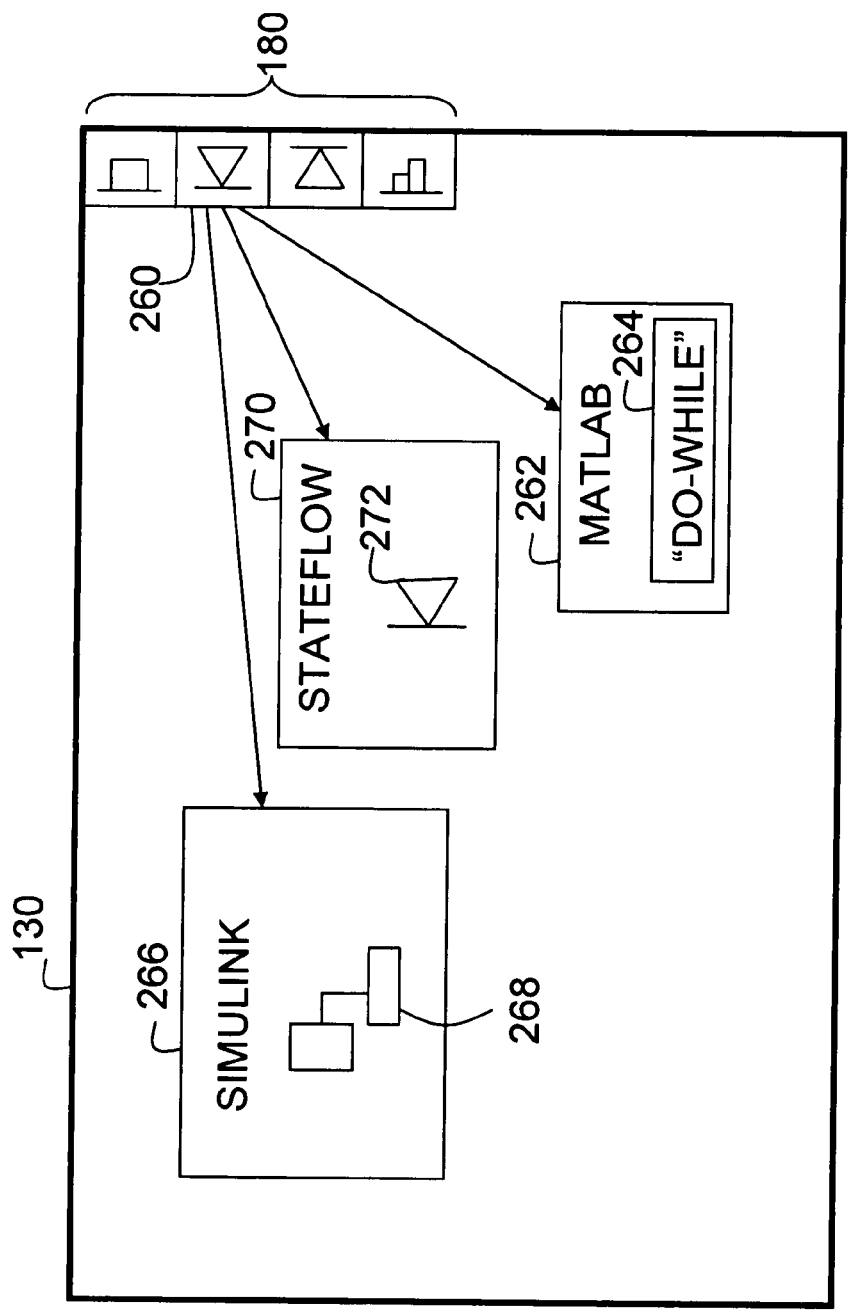
FIG. 2B is a diagrammatic illustration of an exemplary display screen according to an exemplary embodiment.

With reference to FIG. 2B, the user may select a construct icon 260 representing and associated, for example, with a construct "DO-WHILE". For example, if the user drops the selected construct icon 260 into a text-based modeling or computing environment screen 262, a corresponding template including text "DO-WHILE" 264 is selected. If the user drops the selected construct icon 260 into a block-based graphical modeling or computing environment screen 266, a corresponding template including block diagram 268 representing the construct "DO-WHILE" is selected. If the user drops the selected construct icon 260 into a chart-based graphical modeling or computing environment screen 270, a corresponding template including a flowchart 272 representing the construct "DO-WHILE" is selected.

With reference again to FIG. 2A, a template inserter, mechanism, device, algorithm, processor, software module, or other means 280 may insert the selected template at the determined position in the computing environment 154, 156 with the knowledge of context. After the model is created in the manner described above, time-dependent mathematical relationships among the selected system's inputs, states, and outputs may be determined. The system further may be simulated from a specified start time to a specified stop time. The deployable software systems or descriptions of hardware systems that mimic the behavior of either the entire model or portions of the model may be produced.

With reference again to FIG. 1A and further reference to FIG. 3, the user may select 310 the construct icon 182 on the design tool bar window 170 with the mouse 122. The user may drag 320 the selected construct icon 182 into a selected computing environment interface screen 172, 174. A type of the construct 176 associated with the selected construct icon 182 may be determined 322. The user may drop 330 the dragged construct icon 182 into the selected computing environment interface screen 172, 174 which interfaces with respective textual or graphical computing environment 154, 156. A position of the dropped construct icon 182 may be determined 340. A type of the selected computing environment 154, 156 may be determined 350. A template, corresponding to the selected construct and selected computing environment, may be selected 360. The selected template may be inserted 370 in the position of determined construct icon drop.

Figure 4A:
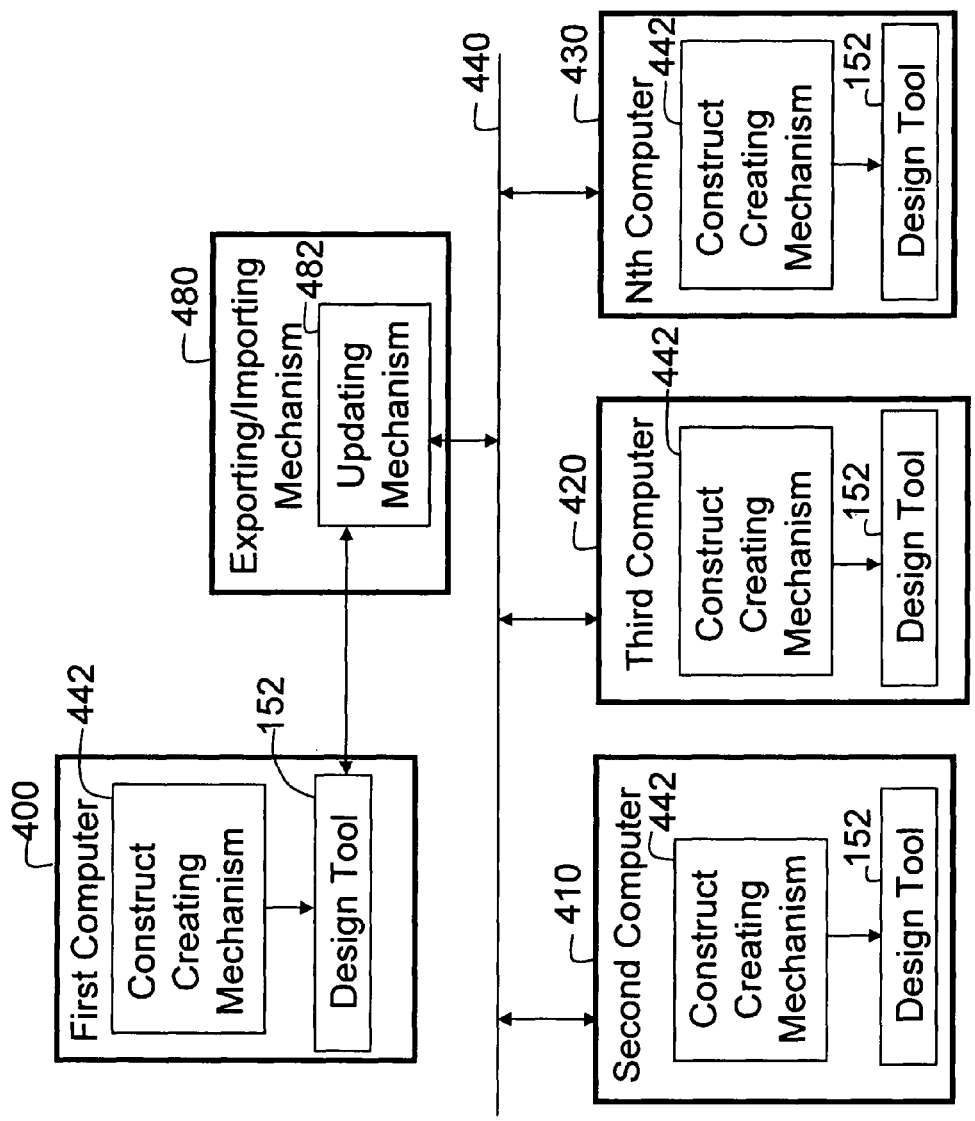
FIG. 4A is a diagrammatic illustration of an exemplary modeling system according to an exemplary embodiment.

With continuing reference to FIG. 1A and further reference to FIG. 4A, first second, third, . . . , Nth client computers 400, 410, 420, 430 of selected users may be interconnected through a network 440. For example, the selected users all are employees of the same entity such as a corporation or the same department within the entity. Each client computer 400, 410, 420, 430 is embodied similarly to the computer 110 of FIG. 1A and includes at least the components of the computer 110 as described above. A construct creating mechanism, device, algorithm, processor, software module, or other means 442 facilitates modifications of the design tool 152 and design tool bar window 170 based, for example, on a user input.

Figure 4B:
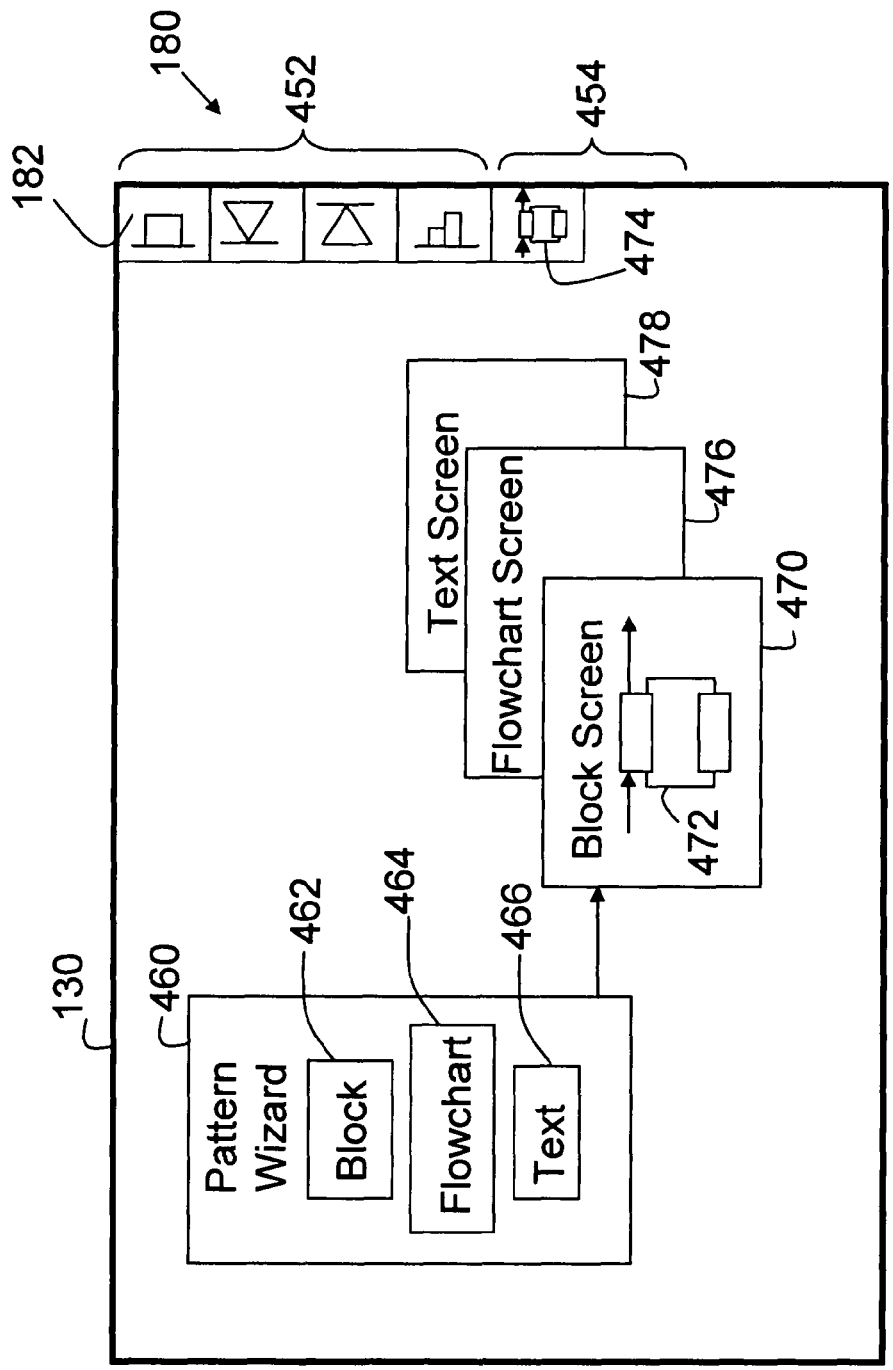
FIG. 4B is a diagrammatic illustration of an exemplary display screen according to an exemplary embodiment.
Figure 4D:
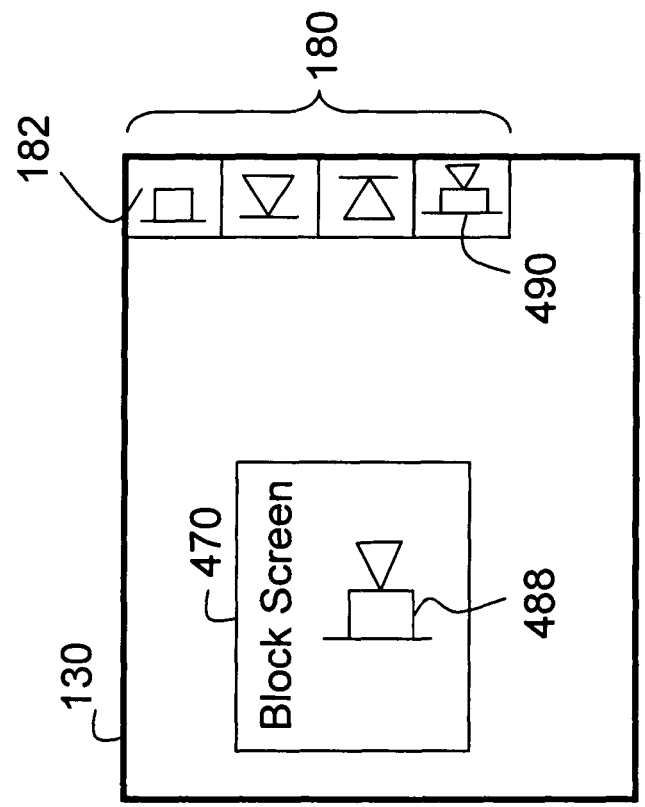
FIG. 4D is a diagrammatic illustration of an exemplary display screen according to an exemplary embodiment.
Figure 4C:
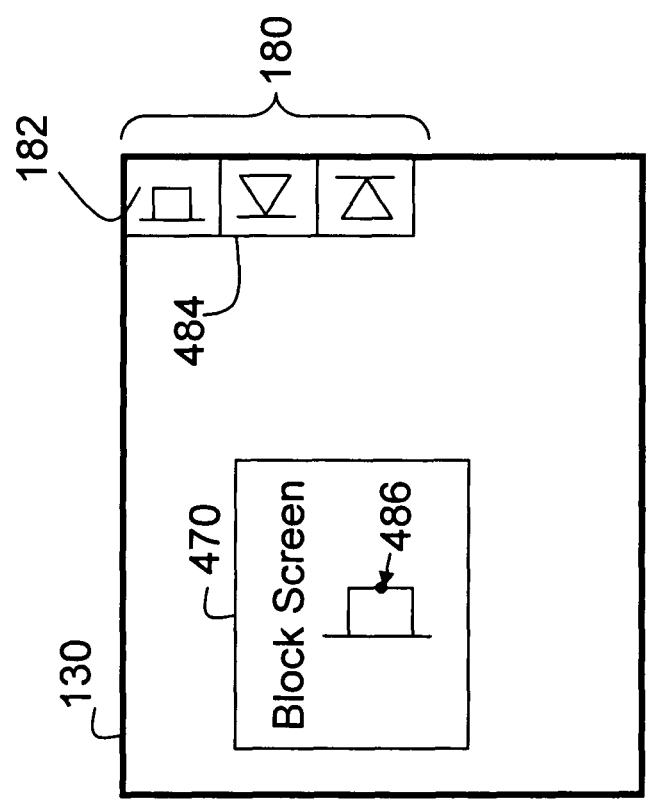
FIG. 4C is a diagrammatic illustration of an exemplary display screen according to an exemplary embodiment.

With continuing reference to FIGS. 1A and 4A and further reference to FIGS. 4B and 4C, the user may create or modify the constructs 176, construct icons 182, or the constructs palette 180. The user may build a new construct using the existent constructs. The construct palette 180 may display first icon or icons 452 for the predefined constructs and second icon or icons 454 for user created constructs. For example, the user may add, delete, rename, or export the constructs. The user may click on a pattern icon, button, wizard or window 460 which may guide the user through the pattern building steps. For example, the user may be presented with a pull down menu, windows or icons to select a computing environment in which the user prefers to build a new pattern. The icons may include a block icon 462 for the block-based graphical modeling or computing environment, a flowchart icon 464 for the chart-based graphical modeling or computing environment, or a text icon 466 for the text-based modeling or computing environment. The user may select the block icon 462 to build the new pattern as a block diagram in the block-based graphical modeling or computing environment. A block screen or window 470 may be displayed. The user may create a new pattern 472 on the block screen 470 by using the mouse 122. The user may associate the created pattern 472 with a construct icon 474 by dragging the created pattern with the mouse 122 and placing the created pattern 472 on the construct palette 180 in the area 454 for the user created constructs. The pattern icon 460 may guide the user to populate other computing environments represented by a flowchart screen or window 476 for the chart-based graphical modeling or computing environment and a text screen or window 478 for the text-based modeling or computing environment. The user may drag the created construct 472 with the mouse 122 and drop the created construct 472 into the flowchart screen and the text screen 476, 478. The design tool 152 may restructure the dropped construct for the appropriate computing environment context. It is contemplated that the construct palette 180 may be organized by the users according to their preferences.

In one exemplary embodiment, the user may click on the pattern wizard 460 which may guide the user through the building steps for a pattern template or construct which is independent and different from any computing environment. The design tool may convert the construct created in such independent environment into a block for the block-based graphical modeling or computing environment, a flowchart for the chart-based graphical modeling or computing environment, or a text for the text-based modeling or computing environment depending on into which environment the construct is inserted.

The modified or newly created construct may be saved in the design tool 152. For example, when the modifications are made to the design tool 152 and/or the design tool bar window 170 by the user of the first computer 400, an exporting/importing mechanism 480 propagates the modifications to the design tools 152 and/or design tool bar windows 170 of the second, third, and Nth client computers 410, 420, 430. In one embodiment, the design tool 152 and/or design tool bar window 170 of each client computer 410, 420, 430 is updated by broadcasting a message among the client computers 400, 410, 420, 430. In another embodiment, the design tool 152 and/or design tool bar window 170 of each client computer 400, 410, 420, 430 is automatically updated via an updating mechanism 482 such as a server using, for example, a push or a pull protocol known in the art.

In one embodiment, a host computer may embody the construct creating mechanism 442 to modify the constructs, etc. and/or the exporting/importing mechanism 482 to make newly created constructs available for use by the users of the selected computers.

With continuing reference to FIG. 1A and further reference to FIG. 4C, a construct can be created by using a multi-touch sensing or rear-projecting device embodied within the display 130. The user may touch and hold the construct icon 484 and touch a point 486 in the block screen. Alternatively, this may be a drag and drop operation. A resulting new pattern or construct 488 is illustrated in FIG. 4D. As described above, the newly created construct 488 may be saved in the design tool 152. The construct palette 180 may be updated with an icon 490 corresponding to the newly created construct 488.

Figure 5:
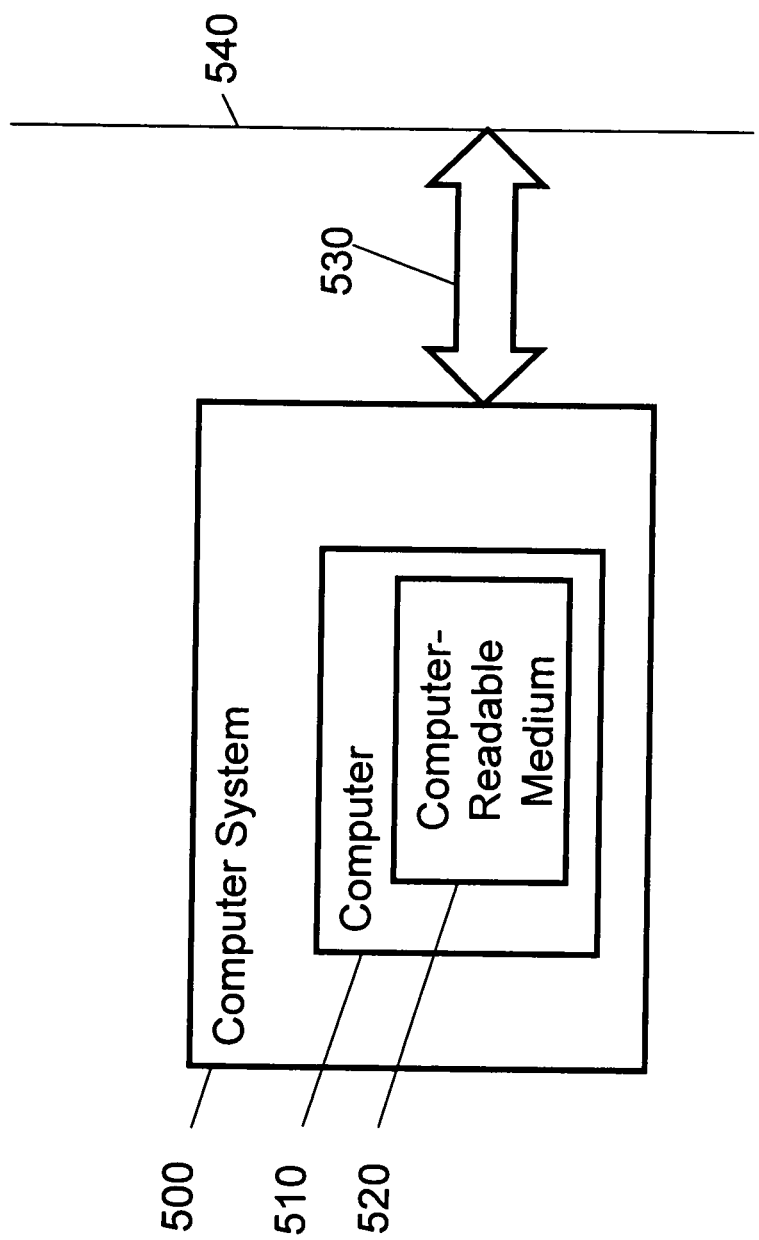
FIG. 5 is a diagrammatic illustration of a computer system for use with the exemplary embodiments.

With reference to FIG. 5, the exemplary embodiment of FIG. 1A may be embodied as a computer system 500 which may include a computer 510. The computer 510 may include a computer readable medium 520 embodying software for implementing the systems and methods described herein to operate the computer 510. Optionally, the computer system 500 includes a connection 530 to a network 540 for the computer 510 to send and receive information such as software, data, documents and the like from other computer systems.

The design tool may be embodied in many different ways as a software component. For example, it may be a stand-alone software package, or it may be a software package incorporated as a "tool" in a larger software product, such as, for example, a mathematical analysis product or a test generation product. It may be downloadable from a network, for example, a website, as a stand-alone product or as an add-in package for installation in an existing software application. It may also be available as a client-server software application, or as a web-enabled software application.

The methods and tools described above allow the user to drag and drop entire design constructs into the modeling computing environment. The cross environment design tool provides the template functionality based on predefined and customizable design patterns seamlessly working across textual and graphical computing environments.

Further, the described design tool provides users at-design-time support and guidance to keep their models clean and efficient.

Generally, any architectural structure can be utilized, such as multi-core, multi-device (e.g., distributed configurations), LAN events and the like.

Certain portions of the exemplary embodiments may be implemented as "logic" that performs one or more functions. This logic may include hardware, such as hardwired logic, an application specific integrated circuit, a field programmable gate array, a microprocessor, software, or a combination of hardware and software.

No element, act, or instruction used in the description of the exemplary embodiments should be construed as critical or essential to the exemplary embodiments unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

While various embodiments have been described above, it should be understood that they have been presented by way of example only, and not limitation. Thus, the breadth and scope of the described should not be limited by any of the above-described exemplary embodiments, but should instead be defined only in accordance with the following claims and their equivalents.

What is claimed is:

1. A computer-implemented method for inserting content into a model using a design tool, the method comprising:
   displaying, by a computer, a list of user-selectable construct icons on a user interface screen of the design tool, the construct icons associated with constructs;
   determining, by the computer, a construct icon selected by the user;
   displaying, by the computer, a plurality of computing environment interface screens able to receive the selected construct icon, the plurality of computing environment interface screens being simultaneously displayed on the user interface screen of the design tool and associated with a plurality of computing environments including at least one textual computing environment and at least one graphical computing environment;
   receiving, by the computer, a selection of a selected computing environment interface screen from the plurality of computing environment interface screens into which the construct associated with the user selected construct icon is placed;
   identifying, by the computer, a selected computing environment from the plurality of computing environments, wherein the selected computing environment is associated with the selected computing environment interface screen;
   determining, by the computer, a position of the placed construct in the selected computing environment;
   selecting, by the computer, a template based on the selected computing environment and the placed construct; and
   inserting, by the computer, the selected template into the selected computing environment at the determined position in the selected computing environment.

2. The method according to claim 1, wherein the textual computing environment includes at least one of a C environment, a Python environment, a Javascript environment, an Octave environment, a dynamically typed language environment, or Hardware Description Language environment, and the graphical computing environment includes at least one of a time-based graphical modeling environment, a block-based environment, a chart-based environment, a state-based diagram environment, a data flow diagram environment, an entity flow network diagram environment, an electronic design automation environment, a Schematic Layout environment, or a Unified Modeling Language environment.

3. The method according to claim 1, wherein the construct includes computer-readable medium encoded with at least one of:
   IF-END-IF,
   IF-cascade of ELSE IF-END IF,
   SWITCH condition—cascade of CASE,
   DO-WHILE loop,
   REPEAT-UNTIL loop,
   Proportional-Integral-Derivative controller,
   Proportional-Integral controller,
   Proportional-Derivative controller,
   Integral-Derivative controller,
   Proportional controller,
   Derivative controller,
   Integral controller,
   IF-nested IF condition-nested IF condition-END IF-END IF,
   FOR loop,
   SIMPLE STATE MACHINE,
   TOP LEVEL ARCHITECTURE,
   IF-THEN-ELSE-IF,
   IF-THEN-IF,
   IF-THEN,
   IF-THEN-ELSE,
   IF,
   cascade of IF-THEN,
   FOR-WHILE,
   FOR-loop,
   WHILE-loop,
   parameterized construct,
   case,
   combination of logical signals,
   vector signals,
   conditions,
   conditions with subconditions,
   UNLESS conditions,
   algorithmic components,
   physical systems,
   physical subsystems, or
   conditions which are visually separated.

4. The method according to claim 1, further comprising:
   creating a construct based on a user input;
   storing the construct in the design tool;
   creating a second construct icon that corresponds to the created construct; and
   displaying the second construct icon corresponding to the created construct in the list of constructs on the user interface screen.

5. The method according to claim 4, further comprising:
   at least one of exporting or importing the created construct among selected client computers; and
   sharing the created construct by users of the selected computers.

6. The method according to claim 5, further comprising:
   automatically updating design tools of the selected client computers with the created construct.

7. The method according to claim 6, further comprising:
   automatically updating a list of constructs of a user interface screen associated with each selected computer with the second construct icon; and displaying the second construct icon in the updated list of constructs of the user interface screen of each selected computer.

8. A method for designing models, comprising at least one of:
- downloading software to a computer system, which software, when executed by the computer system, causes the computer system to perform operations comprising the method of claim 1; or
- providing downloadable software to a computer system, which software, when executed by the computer system, causes the computer system to perform operations comprising the method of claim 1.

9. At least one non-transitory computer-readable medium comprising software that, when executed by a computer, causes the computer to perform operations for designing models with a design tool, the at least one computer-readable medium comprising:
- one or more instructions for displaying a list of user-selectable construct icons on a user interface screen of the design tool, the construct icons associated with constructs;
- one or more instructions for determining a construct icon selected by the user;
- one or more instructions for presenting a plurality of computing environment interface screens able to receive the selected construct icon, the plurality of computing environment interface screens being simultaneously displayed on the user interface screen of the design tool and associated with a plurality of computing environments including at least one textual computing environment and at least one graphical computing environment;
- one or more instructions for receiving a selection of a selected computing environment interface screen from the plurality of computing environment interface screens into which the construct associated with the user selected construct icon is placed;
- one or more instructions for identifying a selected computing environment from the plurality of computing environments based on the selected computing environment interface screen;
- one or more instructions for determining a position at which the selected construct is placed into the selected computing environment;
- one or more instructions for selecting a template based on the selected computing environment and the placed construct; and
- one or more instructions for inserting the selected template into the selected computing environment at the determined position in the selected computing environment.

10. The at least one non-transitory computer-readable medium according to claim 9, wherein the textual computing environment includes at least one of a C environment, a Python environment, a Javascript environment, an Octave environment, a dynamically typed language environment, or Hardware Description Language environment and the graphical computing environment includes at least one of a time-based graphical modeling environment, a block-based environment, a chart-based environment, a state-based diagram environment, a data flow diagram environment, an entity flow network diagram environment, an electronic design automation environment, a Schematic Layout environment, or a Unified Modeling Language environment.

11. The at least one non-transitory computer-readable medium according to claim 9, wherein the construct includes at least one of:
- IF-END-IF,
- IF-cascade of ELSE IF-END IF,
- SWITCH condition—cascade of CASE,
- DO-WHILE loop,
- REPEAT-UNTIL loop,
- Proportional-Integral-Derivative controller,
- Proportional-Integral controller,
- Proportional-Derivative controller,
- Integral-Derivative controller,
- Proportional controller,
- Derivative controller,
- Integral controller,
- IF-nested IF condition-nested IF condition-END IF-END IF,
- FOR loop,
- SIMPLE STATE MACHINE,
- TOP LEVEL ARCHITECTURE,
- IF-THEN-ELSE-IF,
- IF-THEN-IF,
- IF-THEN,
- IF-THEN-ELSE,
- IF,
- cascade of IF-THEN,
- FOR-WHILE,
- FOR-loop,
- WHILE-loop,
- parameterized construct,
- case,
- combination of logical signals,
- vector signals,
- conditions,
- conditions with subconditions,
- UNLESS conditions,
- algorithmic components,
- physical systems,
- physical subsystems, or
- conditions which are visually separated.

12. The at least one non-transitory computer-readable medium according to claim 9, further comprising:
- one or more instructions for creating a construct based on a user input;
- one or more instructions for storing the construct in the design tool;
- one or more instructions for creating a second construct icon which corresponds to the created construct; and
- one or more instructions for displaying the second construct icon corresponding to the created construct in the list of constructs on the user interface screen.

13. The at least one non-transitory computer-readable medium according to claim 12, further comprising:
- one or more instructions for at least one of exporting or importing the created construct among selected client computers.

14. The at least one non-transitory computer-readable medium according to claim 13, wherein one or more instructions for at least one of exporting and importing the created construct comprises:
- one or more instructions for automatically updating design tools of the selected client computers with the created construct.

15. The at least one non-transitory computer-readable medium according to claim 14, further comprising:
- one or more instructions for automatically updating a list of constructs of a user interface screen associated with each selected computer with the created second construct icon; and one or more instructions for displaying the created second construct icon in the updated list of constructs of the user interface screen of each selected computer.

16. A system for designing models, comprising:
a display device which displays a list of user-selectable construct icons on a user interface screen, the construct icons associated with constructs and a plurality of computing environment interface screens able to receive the selected construct icon, the plurality of computing environment interface screens being simultaneously displayed on the user interface screen and associated with a plurality of computing environments including at least one textual computing environment and at least one graphical computing environment;
one or more computing systems programmed to perform the following:
determining a construct selected by the user;
receiving a selection of a selected computing environment interface screen from the plurality of computing environment interface screens into which the construct associated with the user selected construct icon is placed;
identifying a selected computing environment from the plurality of computing environments, wherein the selected computing environment is associated with the selected computing environment interface screen;
determining a position at which the construct is placed into the selected computing environment;
selecting a template based on the selected computing environment and the placed construct; and
inserting the selected template into the selected computing environment at the determined position and interconnecting the inserted construct with content of the selected computing environment at the position of insertion.

17. The system according to claim 16, wherein the textual computing environment includes at least one of a C environment, a Python environment, a Javascript environment, an Octave environment, a dynamically typed language environment, or Hardware Description Language environment and the graphical computing environment includes at least one of a time-based graphical modeling environment, a block-based environment, a chart-based environment, a state-based diagram environment, a data flow diagram environment, an entity flow network diagram environment, an electronic design automation environment, a Schematic Layout environment, or a Unified Modeling Language environment.

18. The system according to claim 16, wherein the construct includes at least one of:
IF-END-IF,
IF-cascade of ELSE IF-END IF,
SWITCH condition—cascade of CASE,
DO-WHILE loop,
REPEAT-UNTIL loop,
Proportional-Integral-Derivative controller,
Proportional-Integral controller,
Proportional-Derivative controller,
Integral-Derivative controller,
Proportional controller,
Derivative controller,
Integral controller,
IF-nested IF condition-nested IF condition-END IF-END IF,
FOR loop,
SIMPLE STATE MACHINE,
TOP LEVEL ARCHITECTURE,
IF-THEN-ELSE-IF,
IF-THEN-IF,
IF-THEN,
IF-THEN-ELSE,
IF,
cascade of IF-THEN,
FOR-WHILE,
FOR-loop,
WHILE-loop,
parameterized construct,
case,
combination of logical signals,
vector signals,
conditions,
conditions with subconditions,
UNLESS conditions,
algorithmic components,
physical systems,
physical subsystems, or
conditions which are visually separated.

19. The system according to claim 16, wherein the one or more computing systems are further programmed to perform the following:
creating a construct based on a user input;
storing the construct;
creating a second construct icon which corresponds to the created construct; and
displaying the second construct icon corresponding to the created construct in the list of constructs on the user interface screen.

20. The system according to claim 19, wherein the one or more computing systems are further programmed to perform at least one of exporting or importing the created construct among selected client computers.

21. The system according to claim 20, wherein the exporting and importing automatically updates selected client computers with the created construct and displays the created construct icon on selected client computers.

22. A system for designing models, comprising:
a graphical user interface which displays a list of user-selectable construct icons, the construct icons associated with constructs; and
a processor which is programmed to perform steps of:
presenting the list of construct icons on the graphical user interface,
determining the construct icon selected by the user,
displaying a plurality of computing environment interface screens on the graphical user interface, the computing environment interface screens are able to receive the selected construct icon, the plurality of computing environment interface screens being simultaneously displayed and associated with a plurality of computing environments including at least one textual computing environment and at least one graphical computing environment,
receiving, a selection of a selected computing environment interface screen from the plurality of computing environment interface screens into which the construct associated with the user selected construct icon is placed,
identifying a computing environment from the plurality of computing environments, wherein the selected computing environment is associated with the selected computing environment interface screen the construct,
determining a position of the placed construct in the selected computing environment, selecting a template based on the selected computing environment and the placed construct, inserting the selected template into the selected computing environment at the determined position in the selected computing environment, interconnecting the selected template with content of the selected computing environment at the position of insertion, and displaying the designed model on the graphical user interface.

* * * * *

UNITED STATES PATENT AND TRADEMARK OFFICE
CERTIFICATE OF CORRECTION

| | | |
|---|---|---|
| PATENT NO. | : 8,776,015 B1 | Page 1 of 1 |
| APPLICATION NO. | : 11/882825 | |
| DATED | : July 8, 2014 | |
| INVENTOR(S) | : Hosagrahara et al. | |

It is certified that error appears in the above-identified patent and that said Letters Patent is hereby corrected as shown below:

In the Claims:

1. At Claim 22, column 16, lines 62-64, replace "the selected computing environment is associated with the selected computing environment interface screen the construct," with --the selected computing environment is associated with the selected computing environment interface screen,--.

Signed and Sealed this
Eighteenth Day of November, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,776,015 B1 | Page 1 of 1 |
| APPLICATION NO. | : 11/882825 | |
| DATED | : July 8, 2014 | |
| INVENTOR(S) | : Hosagrahara et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1977 days.

Signed and Sealed this
Fifteenth Day of March, 2016

Michelle K. Lee
*Director of the United States Patent and Trademark Office*